United States Patent

[11] 3,573,390

[72] Inventors William T. Frost
Los Gatos;
Armand P. Neukermans, Stanford, Calif.

[21] Appl. No. 791,418
[22] Filed Jan. 15, 1969
[45] Patented Apr. 6, 1971
[73] Assignee International Business Machines Corporation
Armonk, N.Y.

[54] MAGNETIC TRANSDUCING SYSTEM
8 Claims, 2 Drawing Figs.

[52] U.S. Cl. .......... 179/100.2E
340/174.1H, 346/74M
[51] Int. Cl. .......... G11b 5/86
[50] Field of Search .......... 179/100.2
(E), 100.2 (MI), 100.2 (CA); 340/174.1 (H);
346/74 (MOF)

[56] References Cited

UNITED STATES PATENTS

| | | | |
|---|---|---|---|
| 3,277,244 | 10/1966 | Frost .......... | 179/100.2 |
| 3,341,854 | 9/1967 | Supernowicz .......... | 179/100.2 |
| 3,439,918 | 4/1969 | Walter .......... | 346/74 |

*Primary Examiner*—Terrell W. Fears
*Assistant Examiner*—J. Russell Goudeau
*Attorneys*—Hanifin and Jancin and Vincent W. Cleary

ABSTRACT: A system for using a first magnetic head that develops flux lines transverse to the direction of a magnetic track for transposing a high density recording on the track by magnetic transfer to another tape which is arranged in a loop configuration. A second head with a relatively short magnetic gap is then utilized to read out this high density recording of the single track on the second tape. Thus, the head requirement for read out of the narrow track high density recording is essentially divided into two heads rather than being dependent upon a singular head having a single gap that is both short and narrow.

*INVENTORS.*
WILLIAM T. FROST
ARMAND P. NEUKERMANS
BY [signature]
ATTORNEY

MAGNETIC TRANSDUCING SYSTEM

BACKGROUND OF THE INVENTION

1. Field of the Invention

High density magnetic reproducing.

2. Description of the Prior Art

In order to read very narrow tracks in the conventional manner, it is necessary to utilize a magnetic head with very narrow gap and, in order to pick up high density recording on such a narrow track, the head would also need to have a short gap and be in contact with the tape. Such a head would be very difficult to manufacture, as well as undoubtedly having a rather short lifetime. To date, it is known how to record extremely narrow tracks by having each subsequent recording erase a large portion of the previous track. At the present time, however, there is no known reliable way of reading out from these very narrow tracks.

SUMMARY OF THE INVENTION

It is an object of the invention to provide a new and improved system for reproducing high density recording.

A further object of the invention is the provision of a system for reading out very narrow track high density recording by using conventionally constructed magnetic transducers.

A still further object of the invention is to provide a feasible system for reading out a high density narrow track recording.

Still another object of the invention is a system for reading out or reproducing from a high density narrow track recording, which system is feasible to manufacture.

The above objects of the invention are accomplished to reproduce or read out a narrow high density magnetic track by first magnetically transferring this track to a second recording medium, utilizing a transfer head to reproduce the bias field.

This enables the selective reproduction of a narrow track from the first recording medium to the second so that a single narrow track can be applied to this second recording medium. To reproduce or read out from the second recording medium, a head with a short gap is utilized in order to make feasible reading out the high densities of the track. Thus, the heretofore requirements of a single head to read out from a narrow high density track which heretofore was not feasible, is now made feasible by utilizing magnetic transfer and a normal readout head.

GENERAL DESCRIPTION

Figures 1, 2:
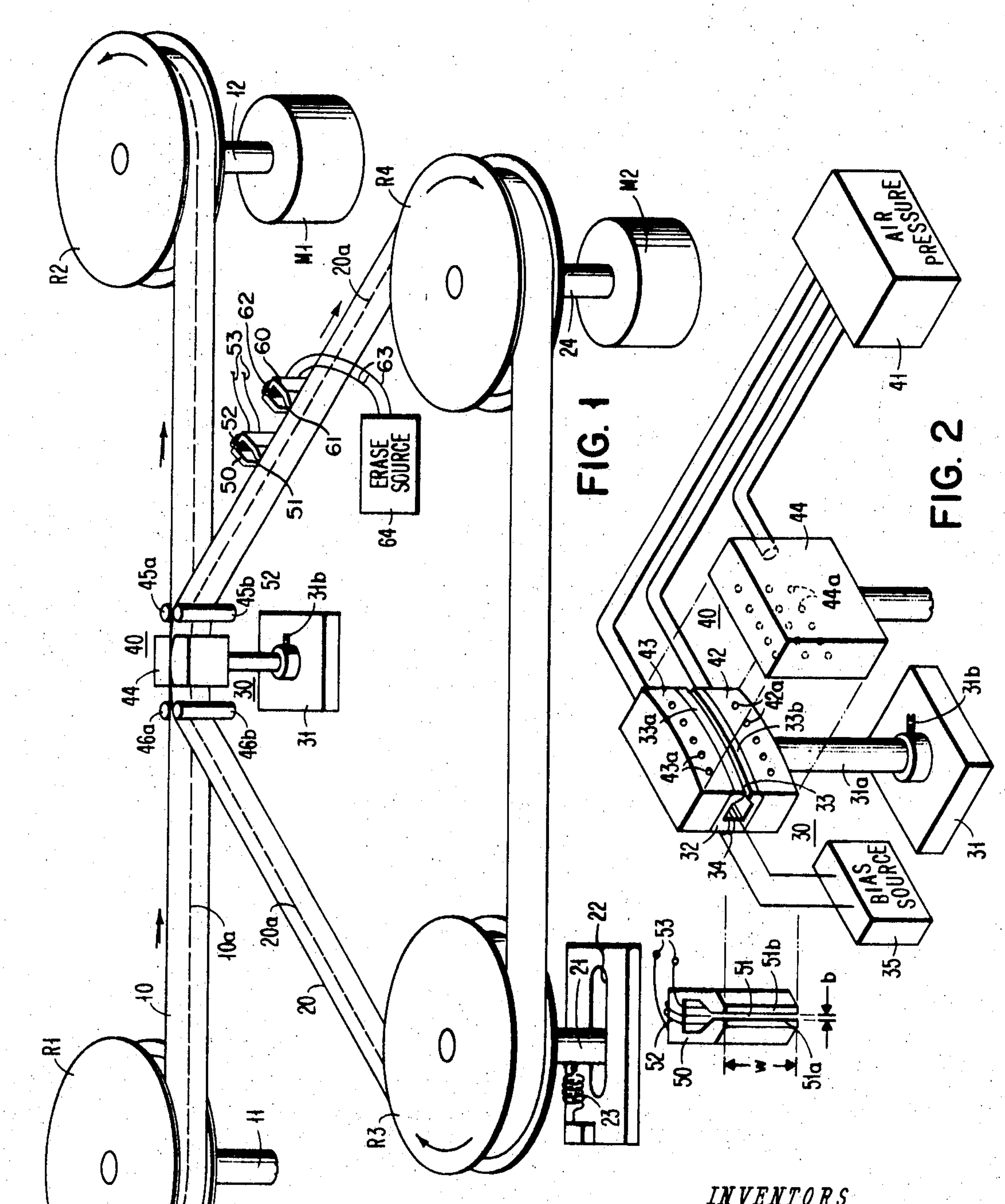
FIG. 1 illustrates a perspective view of a system embodying the invention.
FIG. 2 is an enlarged view of the transfer head and the playback head utilized in the system of FIG. 1.

In the system shown in the drawing, magnetic tapes 10 and 20 are passed by a magnetic transfer station having pressure means 40 and a transfer means 30 which magnetically transfers a track 10*a* from tape 10 to effect a second track 20*a* on tape 20. To produce this magnetic transfer, pressure urging adjacent faces of the two tapes together is effected by pressure means 40, and a magnetic bias is effected by a magnetic head 32 which provides flux lines transverse to the tracks. By so doing, a very narrow track 10*a* is thereby selectively transferred from tape 10 to track 20*a* of tape 20. In order to reproduce this high density narrow track 20*a*, a magnetic head 50 is utilized which is capable of reproducing the high densities of track 20*a* by virtue of a relatively short magnetic gap 51. Thus, rather than utilizing a single head having a magnetic gap that is narrow and short to enable selection of a single track as well as to read out the high density information, these two requirements are made feasible by utilizing two heads, one being a magnetic transfer bias head, and the other a high density read out head.

SPECIFIC DESCRIPTION

Information is initially recorded on a high coercivity master tape 10 by some suitable prior art means not illustrated herein. The information is recorded on the tape in the form of a very narrow, high density track 10*a*. Such a type of recording is illustrated, by way of example, in U.S. Pat. No. 3,058,112. A magnetic transfer as bias means 30 and a pressure means 40 comprise the transfer station. The master tape 10 is passed through the transfer station off the supply reel R1 and onto the take up reel R2. A motor M1 is shown for driving the tape in the direction illustrated by driving shaft 12 and reel R2. Suitable tensioning means would be employed on shaft 11. Required pressure means for magnetic transfer is applied by air pressure and the details of this system for air pressure will not be shown but would be similar to that illustrated in copending Ser. No. 649,680, now U.S. Pat. No. 3,472,971. The slave tape 20, as shown, is a loop which is passed around drive reel R4, idler reel R3 and through the transfer station. A motor M2 is shown for driving reel R4 by way of driven shaft 24. Idler reel R3 is rotatable on a shaft 21 mounted in a slot 22 with suitable tensioning means such as a spring 23 keeping the tape 20 taut. Motors M1 and M2 could preferably be synchronized to drive the tapes at the same linear speed.

Certain components of the transfer station are shown in more detail in FIG. 2. The tapes 10 and 20 are positioned between outer guide rollers 46*a* and 46*b* at one end of the transfer station and between guide rollers 45*a* and 45*b* at the other end of the transfer station. At one side of the transfer station, at the outer side of tape 20 (viewing FIG. 1), is positioned a pressure head having an air pressure chamber 44 therein with air pressure holes 44*a* continually exerting pressure at the outside of tape 10. This air pressure is supplied to chamber 44 by an air pressure source 41.

At the other side of the tape 20 (FIG. 1) and, as illustrated within the tape loop 20, are air pressure chambers 42 and 43 (FIG. 2) positioned below and above a magnetic bias head 32. The lower air pressure chamber 42 has holes 42*a* therein to supply air pressure to one side of tape 20 and upper air pressure chamber 43 has holes 43*a* therein to do likewise. Air pressure is supplied to chambers 42 and 43 from air pressure source 41. The magnetic transfer or bias head 32 includes a relatively wide magnetic gap 33 formed by pole piece 33*a* and 33*b*, to provide a bias field which is created by bias source 35 being applied to windings 34. The pole pieces and magnetic gap 33 provide bias flux lines transverse to the direction of tape travel to selectively transfer a magnetic track such as 10*a* from tape 10 onto tape 20, and thus record a narrow track 20*a* on tape 20. Chambers 43, 42 and head 32 are movable conjunctively in a vertical direction and, as shown, may be mounted in one block to enable the selection of tracks on tape 10 for transfer to tape 20. One form of adjustment is illustrated by moving shaft 31*a* vertically for adjustment by lock 31*b* with respect to mounting means 31. Many other suitable methods of moving this head in a vertical direction could be utilized.

A read out head 50 having a very short magnetic gap 51 is capable of reading out high density information and utilizes windings 52 to so transduce the high density information to output terminals 53. Pole pieces 51*a* and 51*b* (FIG. 2) form the relatively narrow gap 51. A suitable erasing head 60 is also employed, utilizing magnetic gap 61 to effect erasure downstream of head 50. An erase source, 64, such as a conventional oscillator, applies such a force to the winding 62, through lead 63. Thus, shortly after the information on track 20*a* is read out by head 50, it is erased so that upon arriving at the transfer station, tape 20 can again transduce a track from tape 10 to tape 20.

The word "length" of magnetic gap is meant to mean the dimension *b* shown in FIG. 2. The "width" of the magnetic gap is meant to mean dimension "w" shown in FIG. 2.

OPERATION OF THE INVENTION

High coercivity master tape 10 and slave tape loop 20 are threaded through the transfer station (FIG. 1) so that at one side are guides 46*b*, head 32 and chambers 42 and 43, as well as guide 45*b*. At the other side are tape guides 46*a*, pressure chamber 44 and guide 45*a*. Some suitable edge guides to prevent vertical movement of the two tapes should preferably also be used, although they are not illustrated herein. As stated above, the recording on the master tape 10 is done in a narrow track, high density form, such as illustrated in the above identified U.S. Pat. No. 3,058,112. The head 32 is moved vertically in suitable fashion so as to place it in alignment with the desired track 10*a*. Many suitable servo means for this purpose could be utilized. When finally positioned, the length of the gap 33 (dimension b) is transverse to the travel of the tape and also generally parallel to the face of the tape. Consequently, the bias flux lines are transverse to the direction of travel of the tape and the track.

As stated above, the motors M1 and M2 simultaneously drive tapes 10 and 20 and are preferably driven so that the linear speed of tapes 10 and 20 are substantially equal.

The air pressure emanating from chambers 42 and 43 on one side and from chamber 44 on the other side, results in urging the adjacent faces of tapes 10 and 20 together at the transfer station (for magnetic transfer). Such a pressure means is described in more detail in the above identified copending application Ser. No. 649,680 (now U.S. Pat. No. 3,472,971). The bias source 35 applies the field to the head 32 having a relatively wide magnetic gap 33. This enables magnetic transfer between tape 10 and tape 20 of the previously recorded very narrow track 10*a*, resulting in the formation track 20*a* on tape 20. Thus, by using a wide head with a bias gap that produces flux lines transverse to the tape travel, a single very narrow track can be selectively transferred to tape 20. After the transfer to produce track 20*a*, the readout head 50 picks up or reads out the signal from track 20*a*. Due to the very short magnetic gap 51 on head 50, very high density recordings can be reproduced or read out, yet the head can be relatively wide. After read out, preferably an erase head 60 will erase the track so that magnetic transfer can continue on the same track between tape 10 and tape 20.

Thus, it is seen that by dividing the two requirements of a narrow high density track readout between the read out head 50 and the bias head 32, a much higher density recording can be read out than by a single narrow gap head. Furthermore, it can be done with conventional design of magnetic heads. The length of bias gap 33 can be in the order of 1 mil to transfer a narrow track. Construction of such a head is not difficult but is conventional. The length of gap 51 can be as short as feasible. An example would be 50 micro inches. Both heads and gaps, however, can be relatively wide, e.g., 100 mils. Consequently, conventional techniques, or even standard heads can be used. Thus, by first transferring with the bias flux transverse to the track and tape travel and second, reading out by a gap oriented in the same direction as the tape travel, conventional heads can read out narrow, high density travel which heretofore were not readable.

While in accordance with the Patent Statutes, we have described what at present is considered to be the preferred aspect of this invention, it will be obvious to those skilled in the art, that various changes or modifications may be made therein without departing from the present invention.

We claim:

1. A system for reproducing from a first magnetic record a narrow high density magnetic first track, having length and width directions, said system comprising:

magnetic transfer means positioned at a transfer station for transposing said first track to a second magnetic record;

said magnetic transfer means including a bias head having a magnetic gap which effects flux lines transverse to the length of said first track and grouped along a portion of the length of said track, to produce a bias field for duplicating said narrow first track as a second track on said second record;

transducer means for reproducing said second track; and said transducer means comprising a magnetic head having a relatively short gap and being disposed in magnetically coupled relationship with said second track, thereby to reproduce said narrow high density magnetic track by means of both a magnetic transfer bias head and a high density reproducing head.

2. A system as set forth in claim 1 wherein the length of said magnetic gap of said bias head is approximately equal to the width of said first track.

3. A system as set forth in claim 2 wherein said second track is endless.

4. A system as set forth in claim 3 wherein said first and said second magnetic records are magnetic tapes and said second record is an endless tape loop.

5. A system as set forth in claim 4 including a means for erasing said second track after said second track is reproduced by said short gap magnetic reproducing head.

6. A system for reproducing from a first magnetic tape a narrow high density magnetic first track having length and width directions, said system comprising:

a second magnetic tape;

magnetic transfer means positioned at a transfer station and including means for applying pressure to said first and said second magnetic tapes at said transfer station so that juxtaposed magnetic surfaces of said tapes are in intimate contact;

means for applying a bias field to the juxtaposed surfaces of said tapes at said transfer station to transfer and duplicate said narrow track as a second track on said second magnetic tape;

said biasing means including a first magnetic head having a magnetic gap for producing a bias field with flux lines disposed in transverse relationship to the length of said first track and grouped along a portion of the length of said first track;

first and second drive means for driving said first and second magnetic tapes respectively through said transfer station;

transducer means downstream from said transfer station for reproducing said second track from said second tape; and said transducer means comprising a second magnetic head magnetically coupled with said second track.

7. A system as set forth in claim 6 including erase means downstream from said magnetic head for erasing said second track after said narrow high density track has been reproduced from said second magnetic tape by said second magnetic head.

8. A system as set forth in claim 6 wherein said second magnetic tape is an endless type loop.